(12) United States Patent
Kim et al.

(10) Patent No.: US 8,045,068 B2
(45) Date of Patent: Oct. 25, 2011

(54) DISPLAY APPARATUS WITH GRADATION PATTERN NEAR DISPLAY BOUNDARY

(75) Inventors: Yun-Joo Kim, Pyeongtaek-si (KR); Moung-Youb Lee, Pyeongtaek-si (KR); Seung-Hyun Yun, Pyeongtaek-si (KR); Jong-Hyun Byeon, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 12/575,349

(22) Filed: Oct. 7, 2009

(65) Prior Publication Data

US 2010/0259829 A1 Oct. 14, 2010

(30) Foreign Application Priority Data

Apr. 9, 2009 (KR) .................. 10-2009-0030914
Apr. 9, 2009 (KR) .................. 10-2009-0030915

(51) Int. Cl.
*H04N 5/64* (2006.01)
*G02F 1/01* (2006.01)

(52) U.S. Cl. .................... 348/842; 349/58; 359/609

(58) Field of Classification Search .................. 348/842; 349/58; 359/609; 361/807
See application file for complete search history.

(56) References Cited

U.S. PATENT DOCUMENTS

| | | | |
|---|---|---|---|
| 5,061,052 A | 10/1991 | DeJesus | |
| 5,400,177 A | 3/1995 | Petitto et al. | |
| 5,739,880 A * | 4/1998 | Suzuki et al. | 349/110 |
| 5,828,410 A | 10/1998 | Drapeau | |
| 6,313,946 B1 | 11/2001 | Petitto et al. | |
| 6,919,678 B2 * | 7/2005 | Ozolins et al. | 313/479 |
| 7,222,969 B2 | 5/2007 | Veligdan | |
| 7,551,372 B2 | 6/2009 | Xun et al. | |
| 7,567,380 B2 | 7/2009 | Peterson et al. | |
| 7,719,745 B2 * | 5/2010 | Yamada | 359/245 |
| 2006/0158579 A1 * | 7/2006 | Hasegawa | 349/58 |
| 2006/0198033 A1 | 9/2006 | Soyama et al. | |
| 2007/0103854 A1 * | 5/2007 | Yu et al. | 361/681 |
| 2007/0291203 A1 | 12/2007 | Nakahara et al. | 349/113 |
| 2009/0109366 A1 * | 4/2009 | Lippey | 349/58 |
| 2009/0231524 A1 * | 9/2009 | Tanaka | 349/110 |
| 2009/0322982 A1 * | 12/2009 | Finnegan | 349/58 |
| 2010/0232026 A1 | 9/2010 | Park et al. | |
| 2010/0232027 A1 | 9/2010 | Park et al. | |
| 2010/0246104 A1 | 9/2010 | Park et al. | |
| 2010/0259827 A1 * | 10/2010 | Lee et al. | 359/609 |
| 2010/0259828 A1 * | 10/2010 | Byeon et al. | 359/609 |

(Continued)

FOREIGN PATENT DOCUMENTS

JP 2003-215304 7/2003

(Continued)

OTHER PUBLICATIONS

Office Action issued in U.S. Appl. No. 12/630,038 dated Feb. 3, 2011.

(Continued)

*Primary Examiner* — Mark Consilvio
(74) *Attorney, Agent, or Firm* — KED & Associates LLP (57) ABSTRACT

A display apparatus includes a panel located in front of a display module, a pattern formed over the panel, and a reflective layer formed to overlap the pattern. At least one portion of the pattern provided closer to an edge of the panel allows for less transmittance of light and other portions of the pattern.

20 Claims, 12 Drawing Sheets

U.S. PATENT DOCUMENTS

2010/0259829 A1* 10/2010 Kim et al. .................. 359/609
2010/0315570 A1* 12/2010 Mathew et al. ............. 349/58

FOREIGN PATENT DOCUMENTS

| | | |
|---|---|---|
| JP | 2005-166811 | 6/2005 |
| JP | 2005-242265 | 9/2005 |
| JP | 2006-128421 | 5/2006 |
| JP | 2006-179683 | 7/2006 |
| KR | 10-0817560 | 3/2008 |
| KR | 10-0841318 | 6/2008 |
| KR | 10-2008-0106604 | 12/2008 |
| WO | WO 02/27399 | 4/2002 |

OTHER PUBLICATIONS

Office Action issued in U.S. Appl. No. 12/630,026 dated Mar. 21, 2011.
Office Action issued in U.S. Appl. No. 12/630,009 dated Apr. 5, 2011.
International Search Report dated May 26, 2010.
International Search Report dated Mar. 22, 2010.
Notice of Allowance issued in U.S. Appl. No. 12/630,009 dated May 16, 2011.
U.S. Office Action issued in U.S. Appl. No. 12/575,239 dated Jun. 28, 2011.

* cited by examiner

DISPLAY APPARATUS WITH GRADATION PATTERN NEAR DISPLAY BOUNDARY

CROSS-REFERENCE TO RELATED APPLICATIONS

The present application claims priority under 35 U.S.C. 119 and 35 U.S.C. 365 to Korean Patent Applications No. 10-2009-0030914 and No. 10-2009-0030915 (filed on 9 Apr. 2009), which is hereby incorporated by reference in its entirety.

BACKGROUND

1. Field

One or more embodiments described herein relate to a display apparatus.

2. Background

Various electronic devices such as mobile communication terminals, digital cameras, notebook computers, monitors and televisions (TV) include one or more display apparatuses. These apparatuses include Liquid Crystal Display Devices (LCDs), Plasma Display Panels (PDPs), Electro Luminescent Displays (ELDs) and Vacuum Fluorescent Displays (VFDs). Many of these devices have drawbacks that require attention.

DETAILED DESCRIPTION OF THE EMBODIMENTS

Figure 1:
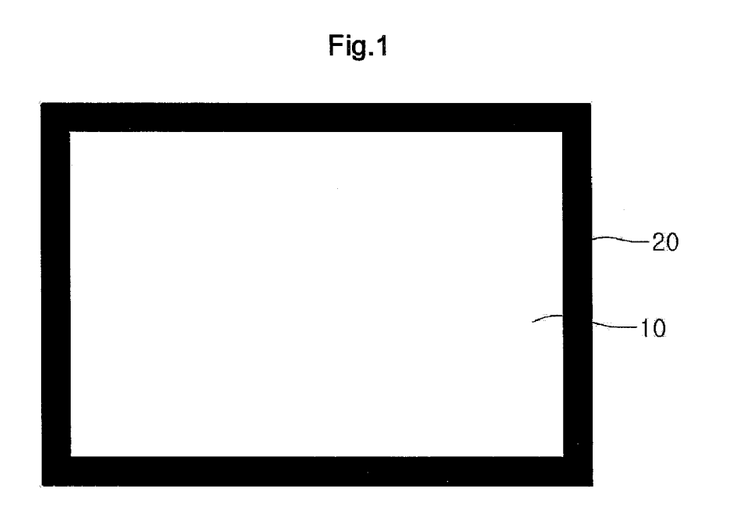
FIG. 1 is a diagram showing a display region and a non-display region of a display apparatus.

FIG. 1 shows a display region 10 in which images are displayed and a non-display region 20 of a display apparatus, as viewed along a front surface of the display apparatus. The non-display region is formed at an outer region of the apparatus has a shape that surrounds the display region.

A light shielding layer may be formed at the non-display region to shield light passing through the outer region of the display apparatus. According to one arrangement, the light shielding layer has a black color, e.g., may be a black layer printed in black. When seen by a user, non-display region 20 appears to be black.

When the display apparatus is powered off, no image is displayed in display region 10 and this region is black. However, the reflection, absorption or diffusion of external light may be different at the display and non-display regions. For example, a portion of external light may be reflected at the display region by an internal display panel, and most of the external light may be absorbed at the non-display region where a black layer is printed. Accordingly, when the display apparatus is powered off, a perceptible visual difference exists between the display and non-display regions. The visual difference is especially evident at a boundary between the display and non-display regions. This existence of this boundary produces a degradation in the design characteristics of the apparatus.

FIGS. 2 to 10 show various arrangements that correspond to a first embodiment of a display apparatus. The display apparatus include a display module 100, a front panel 110, a light shielding layer 120, and a reflective layer 200. The display module radiates light in a front direction where front panel 110 is located and displays images.

The display module may be a liquid crystal display module that includes a liquid crystal panel and a backlight unit. The liquid crystal panel displays pictures using light provided by the backlight unit and may include a liquid crystal layer and a thin film transistor (TFT) substrate and a color filter substrate which face each other about the liquid crystal layer. The backlight unit may provide light using one or more light emitting diodes (LEDs). In alternative embodiments, the display module may be an Electro Luminescent Displays (ELD), Vacuum Fluorescent Display (VFD), OLED, LED, PDP, and so on.

The front panel 110 is spaced from the display module at a certain distance to protect the display module from external impact. By transmitting light radiated from the display module, front panel allows images displayed by the display module to be visible to a viewer. The front panel may be made of a plastic or glass material such as acrylic having impact resistance and light permeability.

Figure 2:
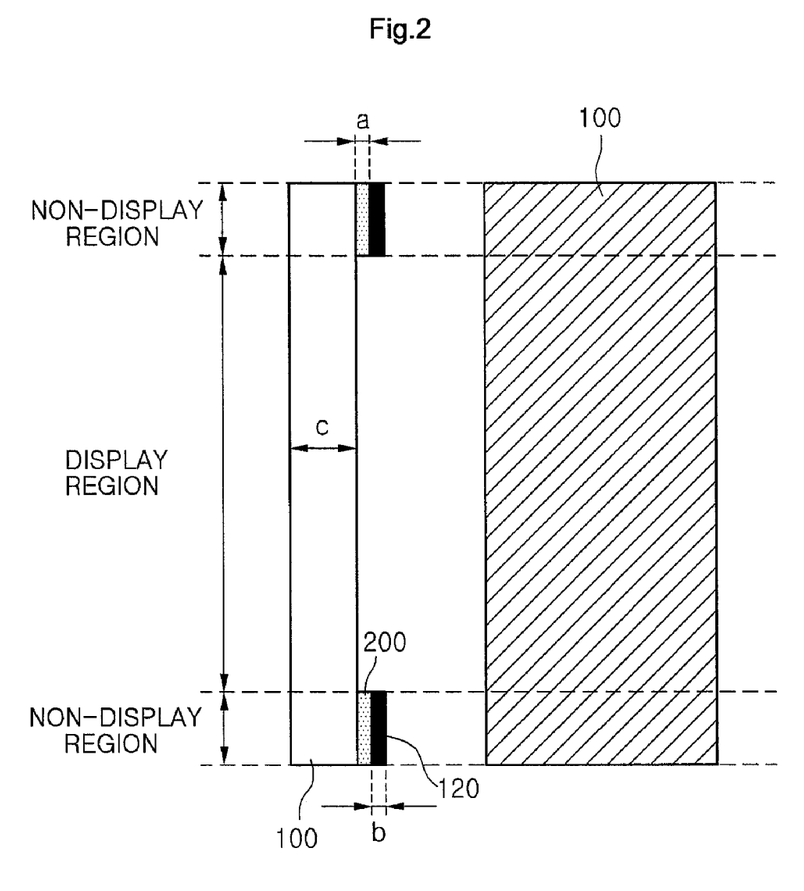
FIGS. 2 to 10 are diagrams showing cross-sectional views of a first embodiment of a display apparatus.

As shown in FIG. 2, the front panel 110 includes a display region which transmits light radiated from display module 100 to display images and a non-display region which surrounds the display region. The light shielding layer 120 may be formed at the non-display region, for example, over the front panel near a periphery of the front panel.

The reflective layer 200 may be formed on a surface of front panel 110 to overlap light shielding layer 120. That is, the light shielding layer and reflective layer may be formed to overlap each other at the non-display region of the front panel. The reflective layer may be formed by depositing a metal thin-film layer (e.g., nickel (Ni) or aluminum (Al)) on one surface of front panel 110.

The reflective layer is also made to be light-reflexible and light-transmittable. For example, the metal thin-film layer forming the reflective layer may be light-reflexible and light-transmittable based on its metal and thin-film characteristics. As a result, reflective layer 200 serves to reflect a portion of external light and transmit a portion of the external light.

The light shielding layer 120 may be disposed between reflective layer 200 and display module 100. For example, as shown in FIG. 2, the reflective layer may be formed at a first surface which is more adjacent to display module 100 among the surfaces of front panel 110 and light shielding layer 120 may be stacked and formed on the reflective layer. The light shielding layer 120 may be a black layer that is printed in black. For example, the light shielding layer may be formed by forming a black print layer on reflective layer 200, which is formed at the first surface of the front panel 110.

As previously described, reflective layer 200 is light-reflexible and light-transmittable, and thus a portion of external light incident on the non-display region is reflected by the reflective layer and is again radiated to the front of the display apparatus (e.g., toward the direction of a viewer), and another portion of the external light incident on the non-display region transmits through the reflective layer to be absorbed by light shielding layer 120. As a result, reflection of the external light that occurs in the display region may occur, for example, to a same or similar degree, in the non-display region as a result of the light-reflective and light-transmittable characteristics of the reflective layer in the non-display region.

Moreover, a portion of the external light incident on the non-display region transmits through the reflective layer to be absorbed by light shielding layer 120, for example, a printed black layer. Therefore, the absorption of external light that occurs in the display region also occurs, for example, to a same or similar degree, in the non-display region and thus both the display region and the non-display region may appear to have the same or a similar black appearance. As a result, when the display apparatus is seen from a front thereof by a viewer, the same or similar visual reflection sensitivity may be seen in both the display and non-display regions and, accordingly, the visual difference between the display and non-display region will be substantially diminished and/or virtually imperceptible when power is off, and this is particularly so at the boundary between these two regions.

As shown in FIG. 2, a thickness 'a' of reflective layer 200 is thinner than a thickness 'b' of light shielding layer 120 and a thickness 'c' of front panel 110. As the thickness 'a' of the reflective layer increases, the reflection rate of the reflective layer increases and the transmission rate of the reflective layer decreases. As a result, the non-display region may appear to be very bright. Conversely, as the thickness 'a' of the reflective layer decreases, the transmission rate of the reflective layer increases and the reflection rate of the reflective layer may excessively decrease.

As an example, to produce these light-reflexible and light-transmittable characteristics of reflective layer 200 and thus to allow the non-display region to have a black and reflection sensitivity as mentioned above when seen by a user, the thickness 'a' of the reflective layer may be about 0.005 to about 0.1 μm and the transmission rate of the reflective layer may be about 30 to about 50%. Moreover, the thickness 'b' of the light shielding layer 120 may be about 0.5 to about 5 μm, and the thickness 'c' of the front panel 110 may be about 1 to about 8 mm.

The thickness 'a' of the reflective layer 200, material, and color of the light shielding layer 120, i.e., the brightness of the printed black layer, may vary according to the configuration of display module 100 or front panel 110 and the distance between the display module and front panel. That is, the thickness 'a' of the reflective layer, material and color of the light shielding layer may be determined so that the colors and reflection sensitivity of the display region and non-display region of the display apparatus can be identically sensed, or at least very nearly so, when seen by a user and more specifically their reflection rates can be very similar or even identical.

According to on arrangement, reflective layer 200 and light shielding layer 120 are formed at the non-display region to overlap each other. As a result, the visual difference between the display and non-display regions when viewed by a viewer decreases and the boundary between these regions becomes virtually imperceptible when power is off. Put differently, the front surface of the display apparatus including the display and non-display regions may appear to a viewer to be a single layer with no boundary.

In the illustrative arrangement of FIG. 2, reflective layer 200 and light shielding layer 120 are shown to have the same width and to completely overlap each other. However, in alternative arrangements, a portion of the reflective layer may not overlap the light shielding layer or a portion of the light shielding layer may not overlap the reflective layer.

Figure 3:
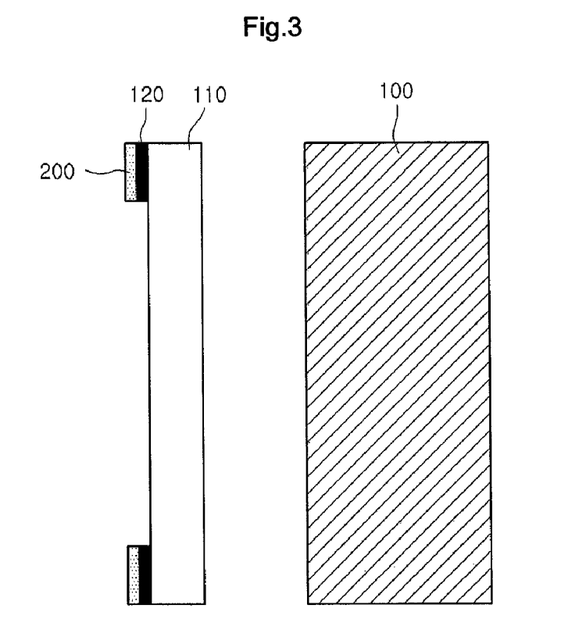

Referring FIG. 3, in another arrangement the light shielding layer 120 may be formed at a second surface farther away from display module 100 among the surfaces of the front panel and reflective layer 200 may be stacked and formed on the light shielding layer. For example, the light shielding layer may be formed by printing a black layer at the second surface of front panel 110 and the reflective layer may be formed on the light shielding layer.

Figure 4:
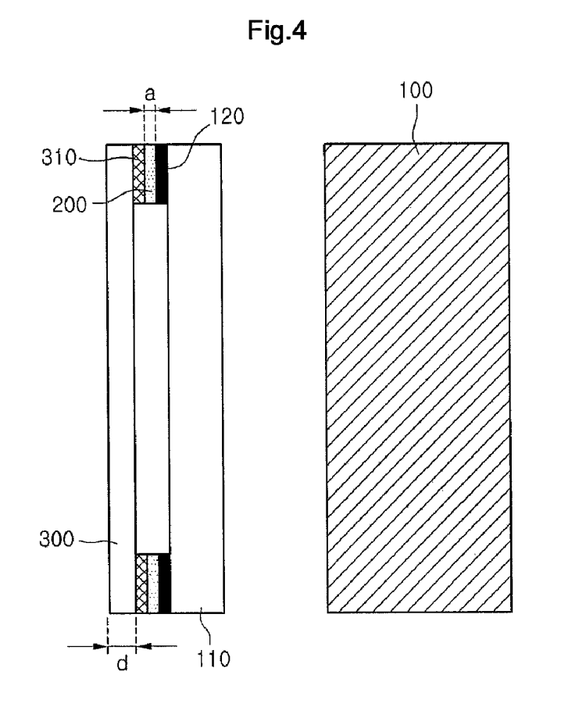

Referring to FIG. 4, in another arrangement a transparent film 300 may be included to be disposed in front of front panel 110. The transparent film may, for example, be formed of PolyEthylen Terephthalate (PET). Moreover, the transparent film may include one or more function layers to enhance the light characteristics of a displayed image.

Also, as shown in FIG. 4, transparent film 300 may be adhered to front panel 110 on which light shielding layer 120 and reflective layer 200 are formed. An adhesive layer 310 may be formed between the transparent film and front panel, and more specifically between the transparent film and reflective layer. According to one example, the thickness 'd' of transparent film 300 may be about 0.05 to 0.4 mm, and may be thicker than the thickness 'a' of reflective layer 200. A hard coating layer (not shown) may be formed at the front surface of the transparent film to protect the transparent film from external impact.

Figure 5:
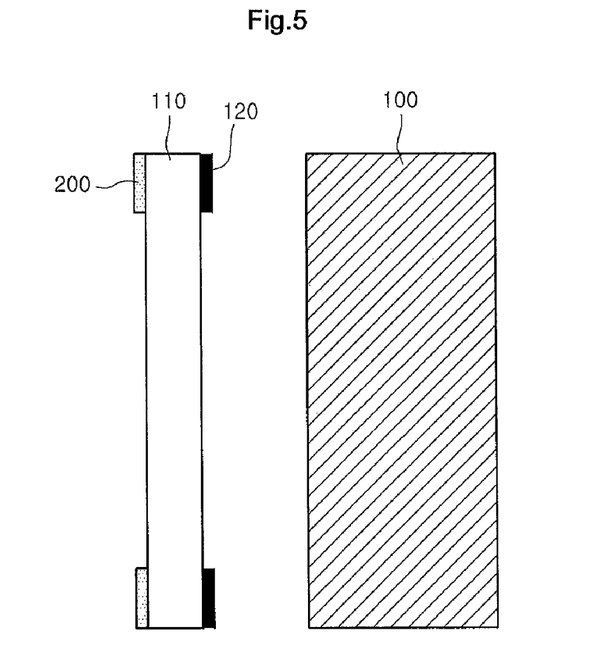

As shown in FIG. 5, in another arrangement the light shielding layer 120 and reflective layer 200 may be formed at the respective surfaces of front panel 110. For example, light shielding layer 120 may be formed at a first surface of the front panel and reflective layer 200 may be formed at a second surface of the front panel.

Figure 6:
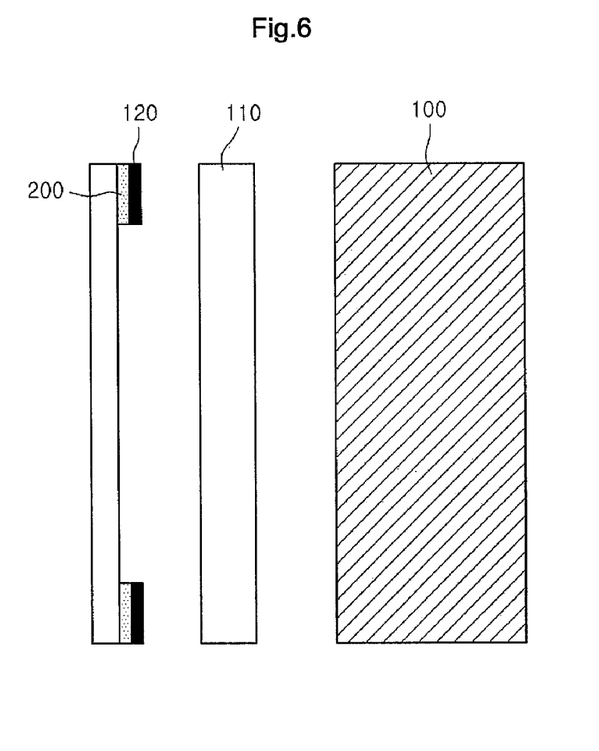
Figure 7:
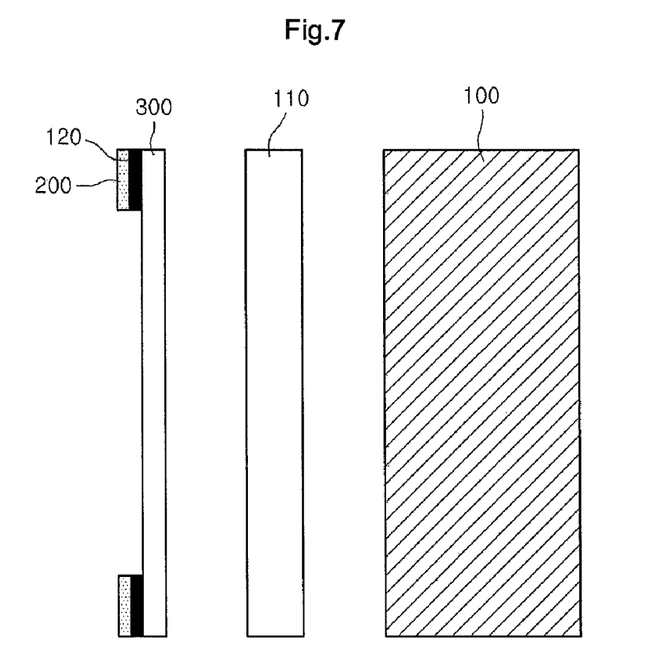
Figure 8:
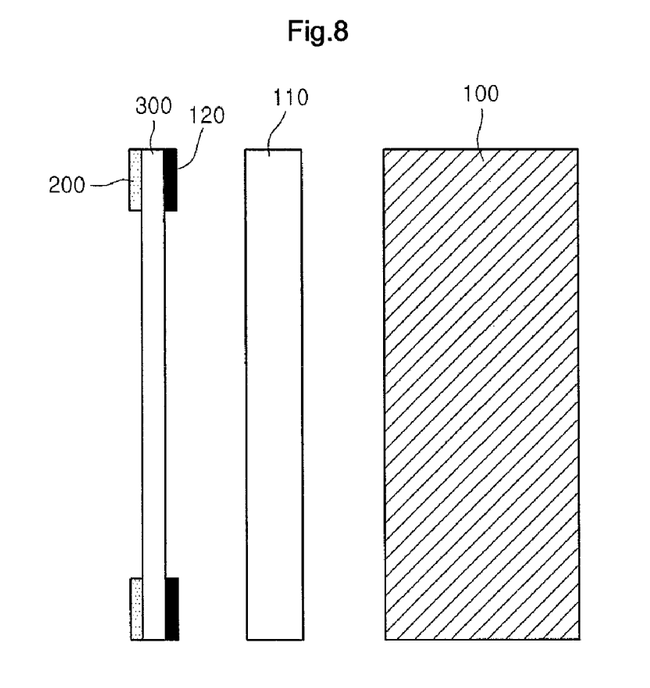

As shown in FIGS. 6 to 8, additional variations have the light shielding and reflective layers formed on the transparent film which is disposed in front of front panel 110.

As shown in FIG. 6, in one arrangement reflective layer 200 may be formed at a first surface that is closer to the display module 100 among the surfaces of transparent film 300 and light shielding layer 120 may be stacked and formed on the reflective layer. The transparent film may be adhered and fixed to front panel 110 by forming an adhesive layer (not shown) between the light shielding layer 120 and the front panel 110.

As shown in FIG. 7, in another arrangement the light shielding layer 120 may be formed at a second surface which is farther away from display module 100 among the surfaces of transparent film 300 and reflective layer 200 may be stacked and formed on the light shielding layer. The transparent film may be adhered and fixed to front panel 110 by forming an adhesive layer (not shown) between the transparent film and front panel 110.

As shown in FIG. 8, in another arrangement the light shielding layer 120 may be formed at a first surface of transparent film 300 and reflective layer 200 may be formed at a second surface of the transparent film. An adhesive layer (not shown) may be formed between the light shielding layer 120 and the front panel 110.

Figure 9:
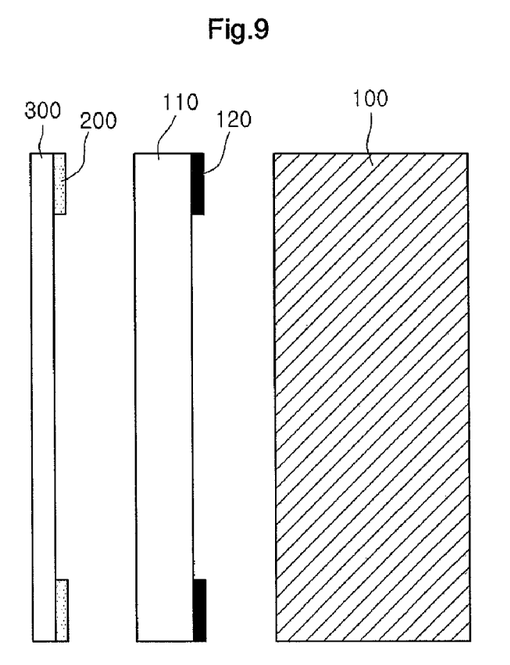

As shown in FIG. 9, the light shielding layer 120 and reflective layer 200 may be formed at front panel 110 and transparent film 300 respectively. For example, the light shielding layer may be formed at a first surface of the front panel and the reflective layer may be formed at a first surface of the transparent film.

Figure 10:
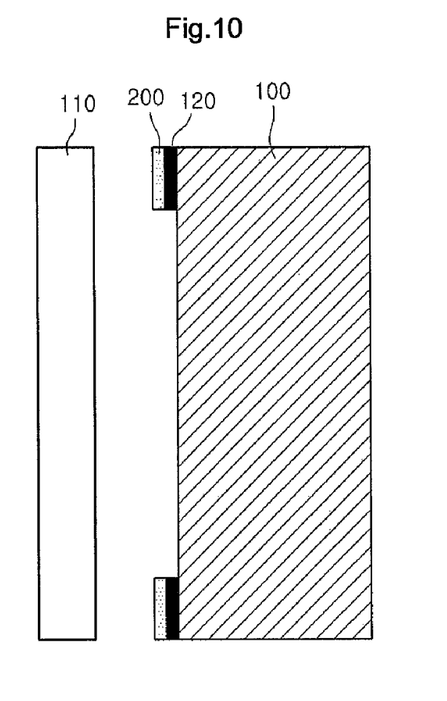

As shown in FIG. 10, in another arrangement at least one of the light shielding layer 120 or reflective layer 200 may be formed on display module 100, for example, on the upper substrate of the display panel. For example, the light shielding layer may be formed on the display module, and the reflective layer may be stacked on the light shielding layer or may be formed at the one surface of front panel 110 or one surface of transparent film 300.

Figure 11:
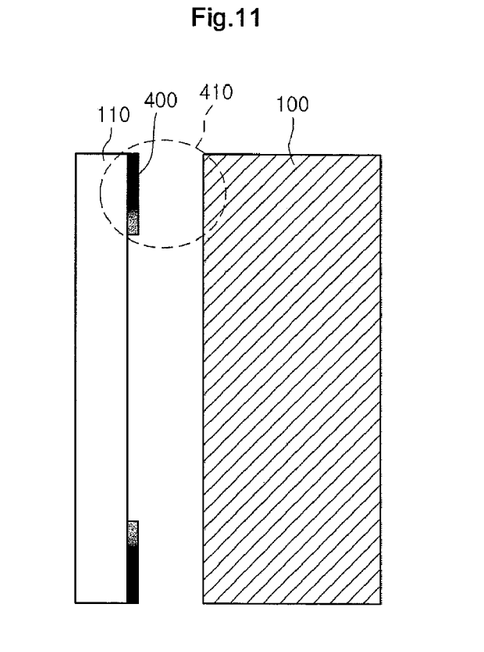
FIGS. 11 to 13 are diagrams showing cross-sectional views of a second embodiment of a display apparatus.
Figure 12:
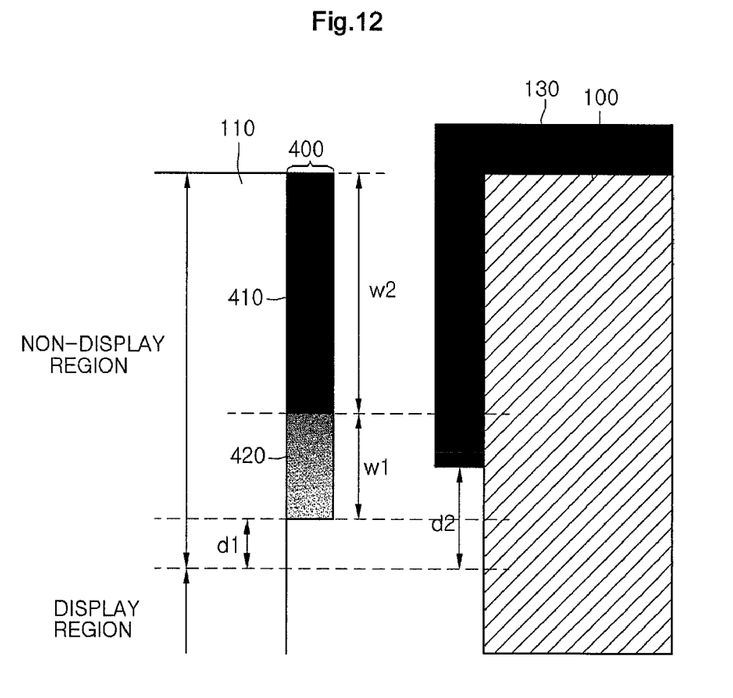
Figure 13:
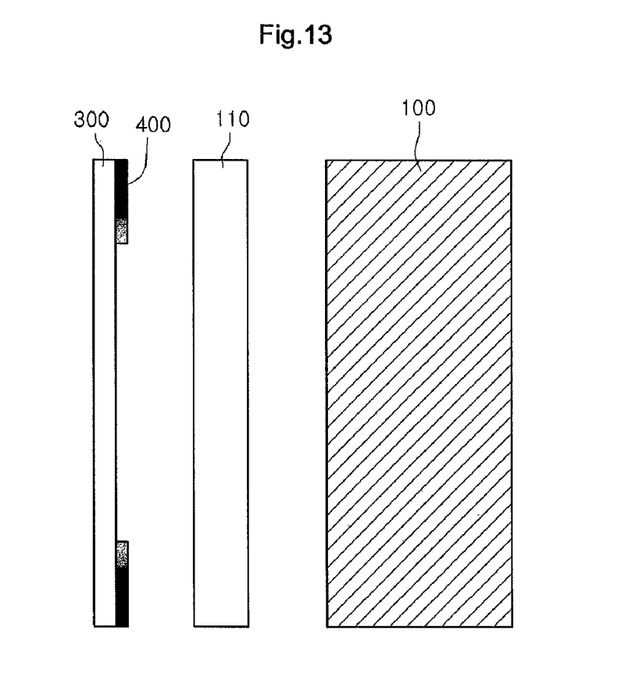

FIGS. 11 to 13 show arrangements corresponding to a second embodiment of a display apparatus. In these arrangements, a gradation pattern is formed at a non-display region. The gradation pattern may, for example, be variable in terms of at least one of color, reflection rate or light transmittance.

Referring to FIG. 11, an arrangement is shown where light shielding layer 400 is formed at the non-display region of front panel 110. A pattern 420 is formed adjacent to light shielding layer 400 and is provided closer to the edge of the transparent film to allow for less transmittance of light That is, light transmittance decreases incrementally or at a predetermine rate in pattern 420 as the pattern progresses in a direction toward an outermost portion of the non-display region. As a result, color tone may incrementally become darker as the pattern progresses toward the outermost edge of the non-display region.

FIG. 12 provides an exploded view of dotted-line portion 410 of FIG. 11. In this view, light shielding layer 400 and pattern 420 are formed on front panel 110, with the pattern is formed adjacent to the light shielding layer. The pattern is formed in contact with the light shielding layer and located closer to the display region than the light shielding layer.

The light shielding layer 400 is a region in which light transmittance is uniform and the pattern is a region in which light transmittance varies incrementally or at a predetermined rate. For example, the light transmittance of pattern 420 may decrease the pattern progresses in a direction towards the light shielding layer. The light transmittance of the light shielding layer may be lower than an average light transmittance of pattern 420.

According to one arrangement, the light transmittance of a portion of pattern 420 that is closer to the display region may be high, e.g., higher than about 85%. The light transmittance may decrease as the pattern approaches light shielding layer 400, and the portion of the pattern close to the boundary between pattern 420 and light shielding layer 400 may have light transmittance which is the same or very close to the light transmittance of the light shielding layer.

For example, light shielding layer 400 may have light transmittance close to 0% and a portion of the pattern 420 at the boundary closest to the light shielding layer may have light transmittance lower than about 5%. Moreover, the width 'w1' of pattern 420 may be set to be narrower than the width 'w2' of light shielding layer 400 in order for the non-display region to appear to wholly have a black color.

By varying the light transmittance of pattern 420 incrementally or otherwise at a predetermined rate, the boundary between the display and non-display regions is may not visually be apparent or may even appear to be virtually imperceptible when power is off. Accordingly, the visual difference between the display and non-display region can be effectively diminished.

The light shielding layer 400 and pattern 420 may be formed by black layer printing. For example, the pattern may be formed by varying the density of a black print point. That is, the light shielding layer may be a black layer printed using a uniform print density, and the print density of pattern 420 may be increased as the pattern progresses in a direction toward the light shielding layer 400.

According to one example, the width 'w1' of pattern 420 may be wider than about 2.5 μm so that the boundary between the display and non-display regions, and more specifically between light shielding layer 400 and the display region, may not be visually apparent as a result of incrementally decreasing the light transmittance of the pattern as the pattern approaches layer 400.

Because the quality of a displayed image may be degraded when pattern 420 overlaps the display region, the width 'w1' of the pattern may be set to within a range in which the pattern does not overlap the display region. To prevent the pattern from overlapping the display region due to a process error, a distance 'd1' between pattern 420 and the display region may be wider than one-half of a distance 'd2' between the display region and a top case 130.

The top case 130 may be provided to cover the outer region of display module 100. Also, the top case may cover the non-display region of the front surface of the display module 100, to thereby protect it. In this case, a portion of the top case 130 which overlaps with the light shielding layer 400 is screened by the second region 410 and thereby is not seen at the front of the display apparatus, but another portion of the top case 130 which overlaps with the pattern 420 may be seen at the front of the display apparatus.

To prevent the exterior quality of the display apparatus from being degraded as a result of a portion of the top case being visible to a user, the top case may be colored in black, e.g., only a portion of the top case which overlaps pattern 420 may be colored in black.

In FIGS. 11 and 12, the light shielding layer 400 and pattern 420 are formed at the first surface (which is closer to display module 100) among the surfaces of front panel 110. However, other arrangements are possible. For example, light shielding layer 400 and pattern 420 may be formed at a second surface which is farther away from display module 100 among the surfaces of the front panel 110.

As shown in FIG. 13, in another arrangement the light shielding layer 400 and pattern 420 may be formed at one surface of transparent film 300 that is disposed in front of the front panel 110. An adhesive layer may be formed between the light shielding layer and front panel and transparent film 300 may be adhered and fixed to the front panel 110.

According to the foregoing embodiments, the light transmittance of pattern 420 varies throughout its length or width. By varying the brightness of the color of the pattern based on the position within the pattern, a perception of the boundary between the display and non-display regions may be significantly diminished or rendered virtually imperceptible when power is off. In one example, the color of pattern 420 may have a highest level of brightness at a portion closest the display region and brightness may decrease as the pattern approaches an outermost edge of the non-display region.

Figure 14:
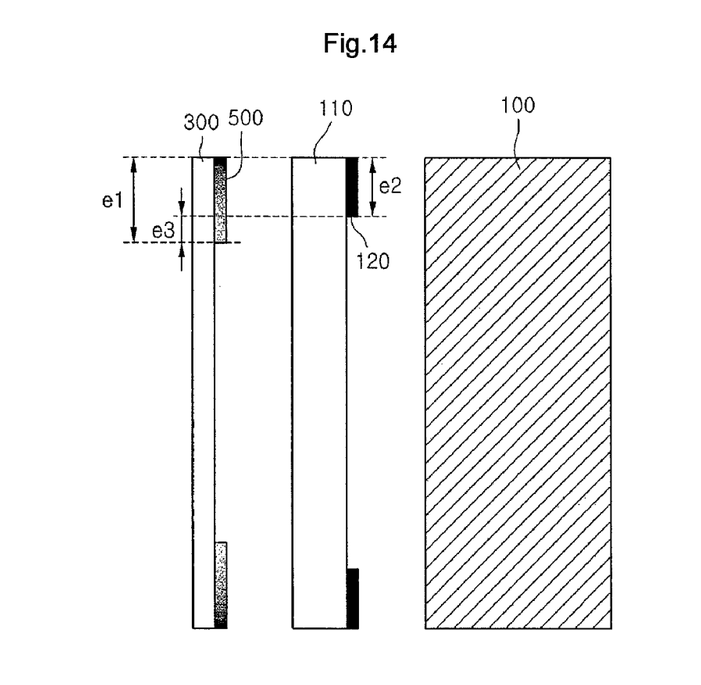
FIGS. 14 to 16 are diagrams showing cross-sectional of a third embodiment of a display apparatus.
Figure 15:
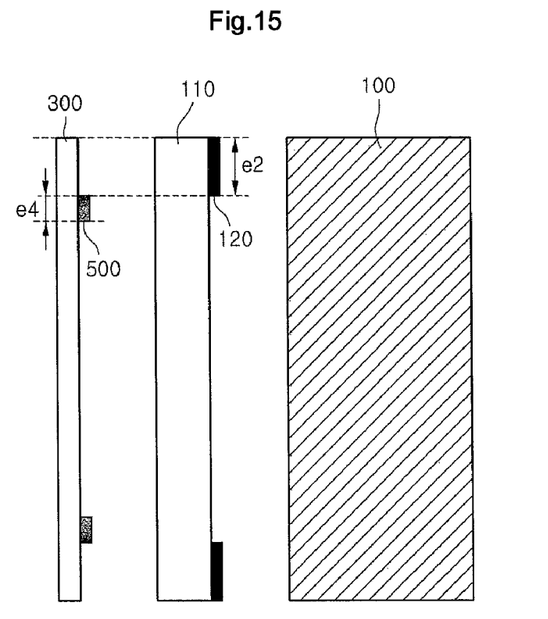
Figure 16:
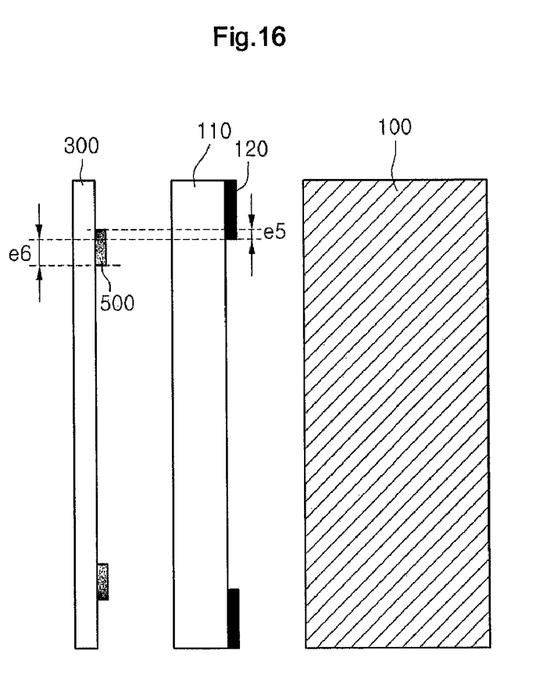

FIGS. 14 to 16 show arrangements corresponding to a third embodiment of a display apparatus where a light shielding layer and gradation pattern are formed on different layers. As shown in FIG. 14, in one arrangement a pattern 500 is formed on a surface of transparent film 300 and light shielding layer 120 is formed on a surface of front panel 110.

Moreover, the light transmittance of pattern 500 may vary throughout its length or width. That is, the light transmittance of the pattern is highest at a portion closest to the display region and then decreases as the pattern approaches an outermost edge of the transparent film. Light shielding layer 120 may have a uniform light transmittance throughout its length and/or width.

For example, a portion of pattern 500 closest to the display region may have light transmittance higher than about 85%. As the pattern progresses in a direction toward the outermost edge of the non-display region, light transmittance of the pattern decreases. A portion of the pattern closest to the outermost edge of the non-display region may have a light transmittance the same or very close to the light transmittance of light shielding layer 120. For example, the light shielding layer may have a light transmittance close to 0% and the portion of pattern 500 closest to the outermost edge of the non-display region may have light transmittance lower than about 5%.

Also, as shown in FIG. 14, the width 'e1' of pattern 500 may be wider than the width 'e2' of light shielding layer 120. Therefore, a lower portion of the pattern may be closer to the display region than the light shielding layer 120 and at the same time not overlap the light shielding layer.

By positioning pattern 500 as described above in front of light shielding layer 120, the boundary between the display and non-display regions and more specifically between the display region and light shielding layer 120 may not be visually apparent or may be made to be visually imperceptible to a viewer when power is off.

The light transmittance of the portion of pattern 500 which does not overlap light shielding layer 120 may have a maximum value at a portion closest to the display region. Light transmittance then decreases incrementally or at a predetermined rate as the pattern progresses in a direction farther away from the display region. As a result, the visual difference between the display and non-display regions may decrease when seen from the front of the display apparatus by a user.

According to one example, to prevent or reduce the likelihood of the boundary between light shielding layer 120 and the display region from being visually perceptible, the width 'e3' of a portion of pattern 500 which does not overlap the light shielding layer may be set to be wider than about 2.5 μm within a range in which the pattern does not overlap the display region. Moreover, the width e1-e3 of a portion of the pattern 500 which overlaps light shielding layer 120 may be wider than the width e3 of a portion of the pattern which does not overlap the light shielding layer 120.

Referring to FIG. 15, in another arrangement pattern 500 is formed at one surface of transparent film 300 so that it does not overlap light shielding layer 120 at least relative to an inner end of the light shielding layer. In this case, a portion of the pattern closest to the display region may have a high light transmittance, e.g., higher than about 85%. The outermost portion of the pattern may have light transmittance which is the same or very close to the light transmittance of light shielding layer 120. For example, light shielding layer 120 may have a light transmittance close to 0% and the outermost portion of pattern 500 may have light transmittance lower than about 5%.

The width 'e4' of pattern 500 may be narrower than the width 'e2' of light shielding layer 120. According to one example, to prevent or reduce the likelihood of the boundary between the light shielding layer 120 and the display region from being visually apparent when power is off, the width 'e4' of the pattern may be set to wider than about 2.5 μm within a range in which the pattern does not overlap the display region. In other arrangements, the width may be different.

Referring to FIG. 16, in another arrangement a portion of pattern 500 may overlap a portion of the light shielding layer 120 and another portion of the pattern may not overlap the light shielding layer. According to one example, the width 'e5' of the portion of the pattern which overlaps the light shielding layer may be narrower than the width 'e6' of the other portion of the pattern which does not overlap the light shielding layer.

To prevent or reduce the likelihood of the boundary between light shielding layer 120 and the display region from being visually apparent when power is off, the width 'e6' of the portion of the pattern which does not overlap the light shielding layer 120 may be set to wider than about 2.5 μm within a range in which the pattern does not overlap the display region. The width may be different in other arrangements.

As shown in FIG. 16, by overlapping a portion of pattern 500 having the narrow width 'e5' with the light shielding layer, the boundary between the display and non-display region can be made less visually apparent or even virtually imperceptible when power is off.

Furthermore, the variation in the pattern may be achieved by varying the density of a black print point during printing. For example, a black layer may be printed so that the print density of the pattern may increase as the pattern progresses in a direction toward the outermost edge of the non-display region. The light shielding layer 120 may be formed by printing a black layer at a uniform print density. In FIGS. 14 to 16, an adhesive layer (not shown) may be formed between pattern 500 and front panel 110 and thus the transparent film 300 may be adhered and thereby fixed to the front panel.

According to the third embodiment which is illustrated in FIGS. 14 to 16, the distance between pattern 500 and the display region may be wider than one-half of the distance between the display region and a top case (not shown) for preventing the pattern 500 from overlapping with the display region due to a process error. In this case, because a portion of the top case (not shown) which overlaps pattern 500 may be seen at the front of the display apparatus, the top case may be colored in black and thus a visual difference may be printed from occurring as a result of the top case.

Figure 17:
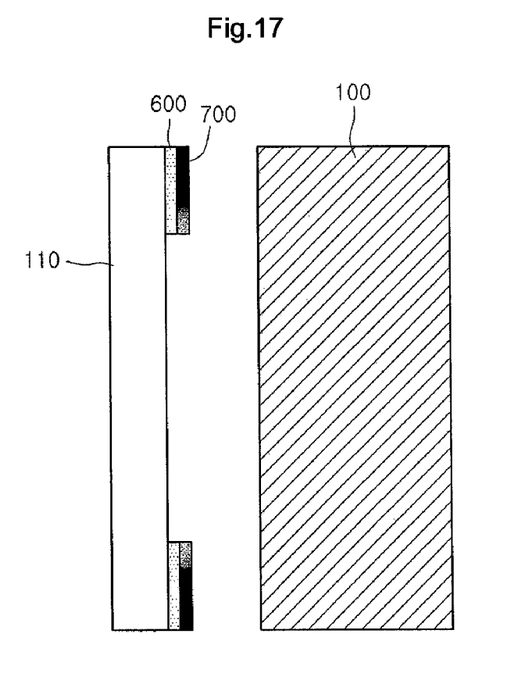
FIGS. 17 to 20 are diagrams showing cross-sectional views of a fourth embodiment of a display apparatus.

FIGS. 17 to 20 show arrangements corresponding to a fourth embodiment of a display apparatus. Referring to FIG. 17, in one arrangement a reflective layer 600, a light shielding layer 700 and gradation pattern 710 may be formed at one surface of front panel 110. The configuration of the reflection layer may, for example, be the same as reflection layer 200 which has been described with reference to FIGS. 2 to 10. Furthermore, the reflection layer may be made from a metal thin-film layer which is light-reflexible and light-transmittable.

The configuration of the light shielding layer and pattern may be the same as that of light shielding layer 400 and pattern 420 described with reference to FIGS. 11 to 13.

As shown in FIG. 17, by overlapping reflection layer 600 with light shielding layer 700 and pattern 710, the display and non-display regions may appear to have the same or very similar reflection sensitivity and therefore a perception of the boundary between the display and non-display regions may be substantially diminished or rendered virtually imperceptible when power is off. Accordingly, the visual difference between the display and non-display regions can be significantly decreased or rendered imperceptible, and thus the front surface of the display apparatus may as appear to a viewer as having one layer with same color and reflection sensitivity.

In FIG. 17, although reflection layer 600, light shielding layer 700 and pattern 710 are formed at a first surface (the one closer to display module 100) among the surfaces of the front panel 110, a different arrangement may be provided.

Figure 18:
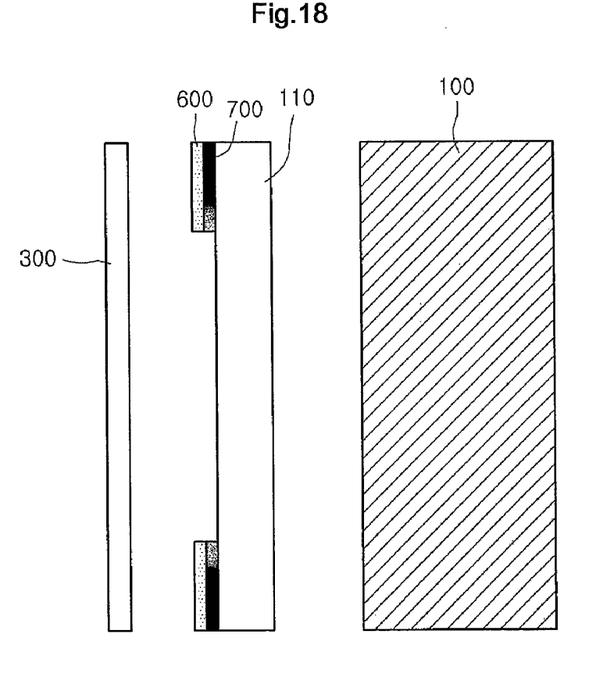

As shown in FIG. 18, in another arrangement the reflection layer 600, light shielding layer 700 and pattern 710 may be formed at a second surface farther away from the display module 100 among the surfaces of front panel 110. Moreover, the reflection layer 600 and the light shielding layer 700 may be formed at respective surfaces of the front panel 110, and the transparent film 300 may be disposed in front of the front panel 110.

Figure 19:
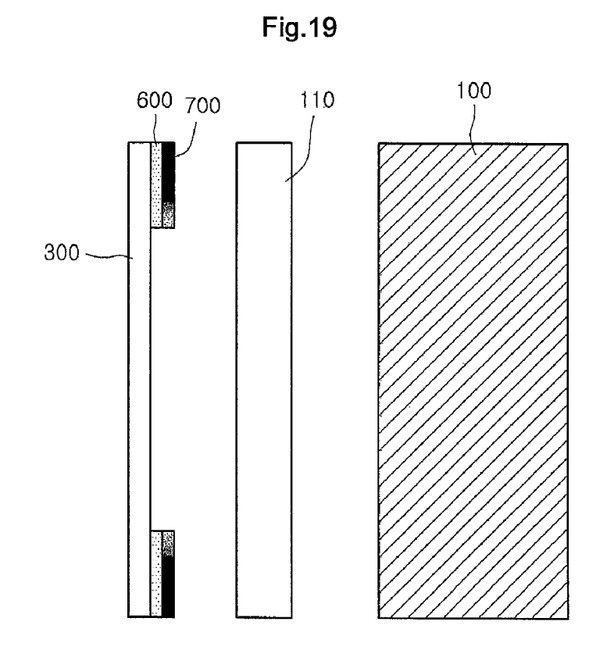

As shown in FIG. 19, in another arrangement reflection layer 600, light shielding layer 700 and pattern 710 may be formed at transparent film 300, which is disposed in front of front panel 300. That is, the reflection layer, light shielding layer, and pattern may be formed at a first surface which is closer to display module 100 among the surfaces of the transparent film.

Figure 20:
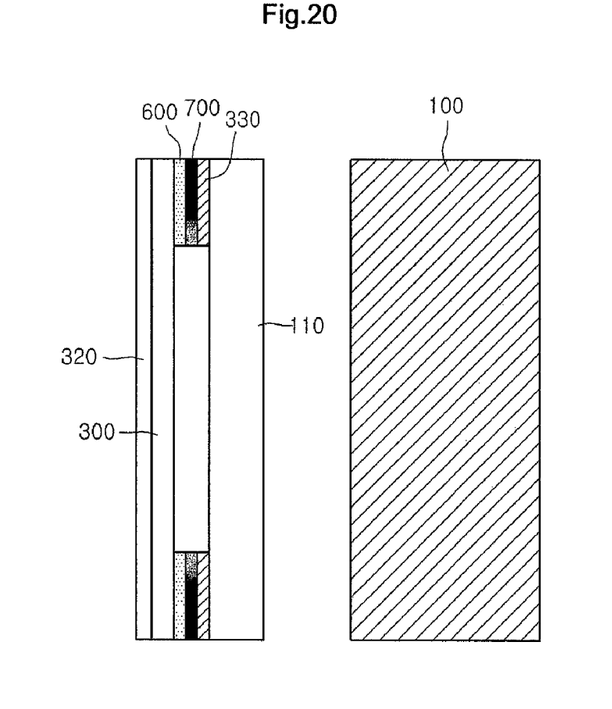

As shown in FIG. 20, the transparent film 300 may be adhered and thereby fixed to the front panel 110 by forming an adhesive layer 330 between the light shielding layer 700 and the front panel 110. Furthermore, a hard coating layer 320 may be formed at the one surface of the transparent film.

FIGS. 21(a)-(e) show cross-sectional views that are produced by corresponding steps in a method for manufacturing a display apparatus. This method may, for example, be used to manufacture the display apparatus shown in FIG. 20.

Figure 21:
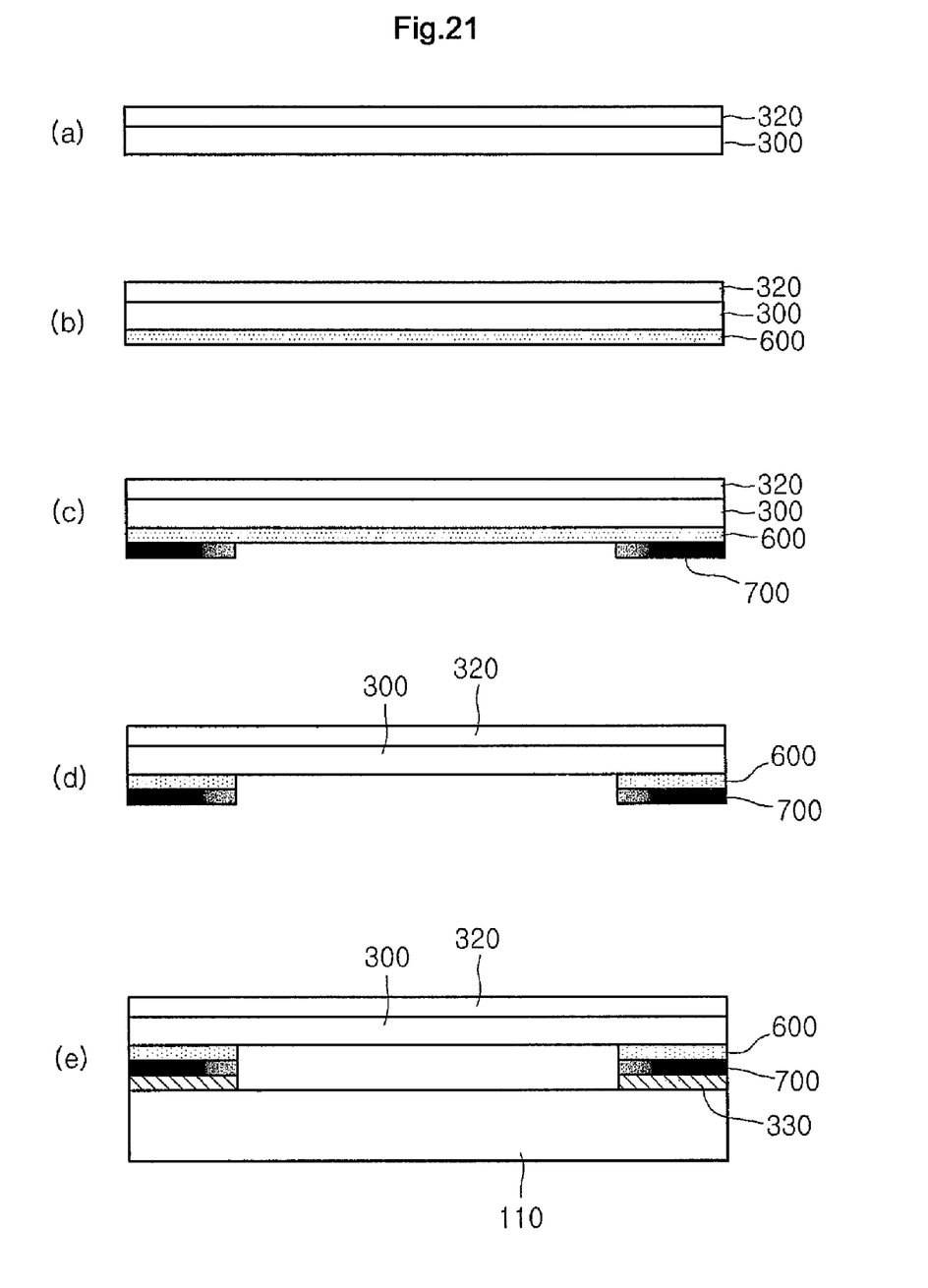
FIGS. 21(a)-(e) are diagrams showing results obtained by various steps in one embodiment of a method for manufacturing a display apparatus.

Referring to FIG. 21(a), a hard coating layer 320 is formed on transparent film 300 which may be formed of PET. As shown in FIG. 21(b), reflection layer 600 is formed by depositing a metal such as Ni or Al at the lower side surface of the transparent film.

As shown in FIG. 21(c), the light shielding layer 700 and pattern 710 are formed by printing a black layer at the non-display region on reflection layer 600. For example, the light shielding layer and pattern may be formed on the reflection layer at once, or the light shielding layer and pattern may be formed on the reflection layer separately.

As shown in FIG. 21(d), a portion of reflection layer 600 in which the light shielding layer 700 and the pattern 710 are not formed is removed through an etching process, wherein the reflection layer is formed at transparent film 300. As shown in FIG. 21(e), the light shielding layer and front panel 110 are adhered by adhesive layer 330.

Figure 22:
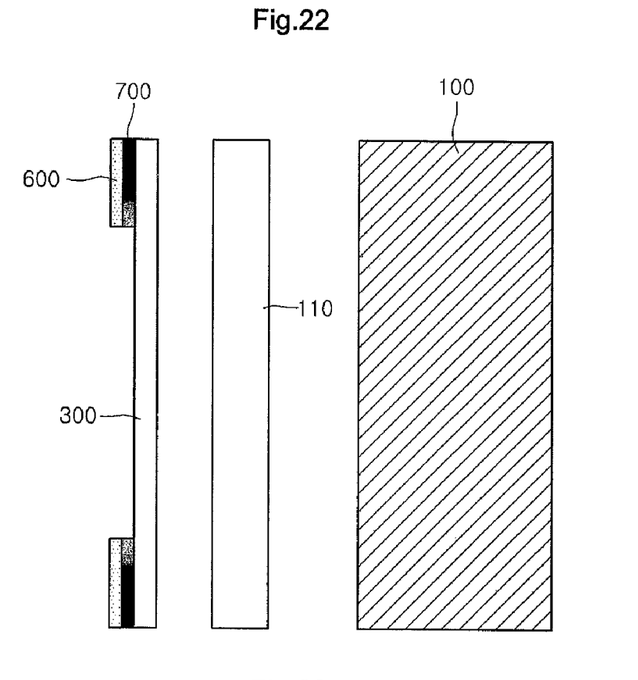
FIGS. 22 and 23 are diagrams showing cross-sectional views of additional arrangements corresponding to the fourth embodiment of the display apparatus.

Referring to FIG. 22, in another arrangement the reflection layer 600, light shielding layer 700 and pattern 710 may be formed at a second surface which is farther away from display module 100 among the surfaces of transparent film 300.

Figure 23:
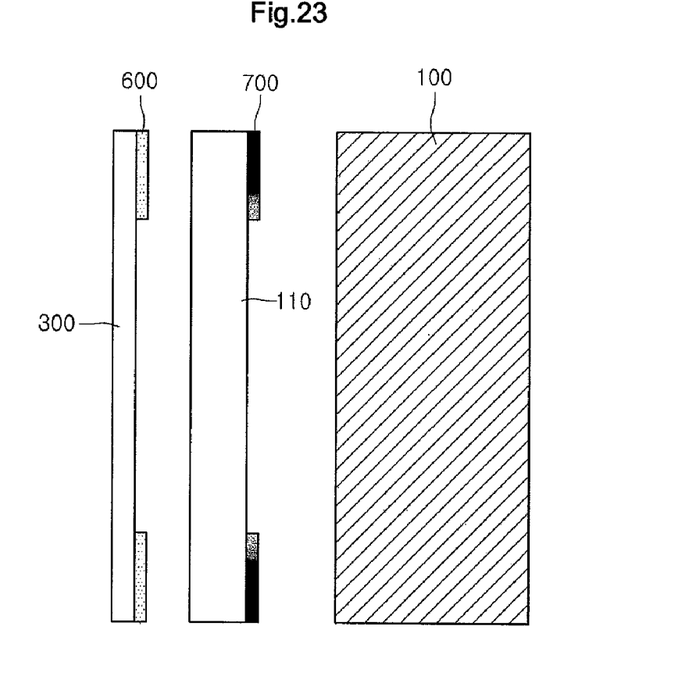

As shown in FIG. 23, alternatively, reflection layer 600 may be formed at transparent film 300 and the light shielding layer 700 and the pattern 710 may be formed at the front panel 110, respectively.

In accordance with one or more of the foregoing embodiments, by forming the reflection layer at the non-display region of the display apparatus, a visual difference (as seen by a user) between the display region and the non-display region can be significantly decreased or rendered virtually imperceptible when the display apparatus is powered off. Accordingly, a front surface of the apparatus is made to apparent as being made from one layer that has a consistent black color. As a result, the exterior design of the display apparatus can be significantly improved.

Embodiments provide a display apparatus which decreases the visual difference between a non-display region and a display region on which images are displayed, thereby improving the exterior of the display apparatus.

In one embodiment, a display apparatus includes: a display module; a front panel provided in front of the display module; a pattern formed over the front panel; and a reflective layer formed to overlap with the pattern, wherein the pattern provided closer to the edge of the front panel allow less transmittance of light.

In another embodiment, a display apparatus includes: a display module; a front panel provided in front of the display module; a light shielding layer provided over the front panel near a periphery of the front panel; a pattern formed adjacent to light shielding layer; and a reflective layer formed to overlap with the light shielding layer, wherein the pattern provided closer to the light shielding layer allow less transmittance of light.

In further another embodiment, a display apparatus includes: a display module; a front panel provided in front of the display module; a light shielding layer provided over the front panel near a periphery of the front panel; a pattern formed adjacent to light shielding layer; and a metal thin-film layer formed to overlap with the light shielding layer and the pattern, wherein the pattern provided closer to the light shielding layer allow less transmittance of light.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
a display module;
a front panel provided in front of the display module;
a pattern formed over the front panel; and
a reflective layer formed to overlap with the pattern,
wherein one portion of the pattern provided closer to an edge of the front panel allows for less transmittance of light and other portions of the pattern.

2. The display apparatus of claim 1, further comprising:
a display region in which an image is displayed, and
a non-display region in which an image is not displayed,
wherein the pattern is formed at the non-display region.

3. The display apparatus of claim 1, wherein the reflective layer is formed by depositing a metal.

4. The display apparatus of claim 1, wherein a thickness of the reflective layer is 0.005 μm to 0.1 μm.

5. The display apparatus of claim 1, wherein light transmittance of the reflective layer is 30 to 50%.

6. A display apparatus, comprising:
a display module;
a front panel provided in front of the display module;
a light shielding layer provided over the front panel near a periphery of the front panel;
a pattern formed adjacent to the light shielding layer; and
a reflective layer formed to overlap with the light shielding layer,
wherein one portion of the pattern provided closer to the light shielding layer allow for less transmittance of light than other portions of the pattern.

7. The display apparatus of claim 6, further comprising:
a display region in which an image is displayed, and
a non-display region in which an image is not displayed,
wherein the light shielding layer and the pattern are formed at the non-display region.

8. The display apparatus of claim 6, wherein the reflective layer has a greater light transmittance than the light shielding layer.

9. The display apparatus of claim 6, wherein an average light transmittance of the pattern is lower than an average light transmittance of the light shielding layer.

10. The display apparatus of claim 6, further comprising:
a top case covering an outer region of the display module at a front, wherein the top case comprises a region which overlaps the pattern.

11. The display apparatus of claim 10, wherein at least a part of the top case is colored in black.

12. The display apparatus of claim 6, wherein the light shielding layer includes a black layer which is printed near a periphery of the front panel and has a substantially uniform light transmittance.

13. The display apparatus of claim 6, wherein the light shielding layer, the pattern and the reflective layer are formed on a surface of the front panel.

14. The display apparatus of claim 6, wherein the reflective layer is formed at a first surface that is closer to the display module among surfaces of the front panel and wherein at least one of the light shielding layer or the pattern is stacked on the reflective layer.

15. The display apparatus of claim 6, wherein the light shielding layer and the pattern are formed at a second surface which is farther away from the display module, among surfaces of the front panel, and wherein the reflective layer is stacked on at least one of the light shielding layer and the pattern.

16. The display apparatus of claim 6, further comprising:
a transparent film provided in front of the front panel, and wherein at least one of the light shielding layer, pattern or reflective layer is formed at a surface of the transparent film.

17. The display apparatus of claim 16, wherein the reflective layer is formed at a first surface which is closer to the display module among surfaces of the transparent film, and wherein at least one of the light shielding layer or the pattern is stacked on the metal thin-film layer.

18. The display apparatus of claim 16, wherein the light shielding layer and the pattern are formed at a second surface which is farther away from the display module among surfaces of the transparent film, and wherein the reflective layer is stacked on at least one of the light shielding layer or the pattern.

19. The display apparatus of claim 16, further comprising:
a hard coating layer provided in front of the transparent film.

20. A display apparatus, comprising:
a display module;
a front panel provided in front of the display module;
a light shielding layer provided over the front panel near a periphery of the front panel;
a pattern formed adjacent to the light shielding layer; and
a metal thin-film layer formed to overlap the light shielding layer and pattern,
wherein a portion of the pattern provided closer to the light shielding layer allows for less transmittance of light than other portions of the pattern.

* * * * *